US012645282B2

(12) United States Patent
Lim et al.

(10) Patent No.: US 12,645,282 B2
(45) Date of Patent: Jun. 2, 2026

(54) MODULAR MEZZANINE POWER VOLTAGE REGULATOR MODULE FOR MEMORY MODULES

(71) Applicant: Intel Corporation, Santa Clara, CA (US)

(72) Inventors: Min Suet Lim, Gelugor (MY); George Vergis, Portland, OR (US); Stephen P. Christianson, Tigard, OR (US); Ankita Tiwari, Sunnyvale, CA (US); Virendra Vikramsinh Adsure, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 17/886,366

(22) Filed: Aug. 11, 2022

(65) Prior Publication Data

US 2022/0391007 A1 Dec. 8, 2022

(51) Int. Cl.
*G06F 1/32* (2019.01)
*G06F 1/3234* (2019.01)

(52) U.S. Cl.
CPC ................................. *G06F 1/3275* (2013.01)

(58) Field of Classification Search
CPC .................................................... G06F 1/3275
See application file for complete search history.

(56) References Cited

U.S. PATENT DOCUMENTS

| | | | |
|---|---|---|---|
| 7,427,809 B2 | 9/2008 | Salmon | |
| 9,298,228 B1* | 3/2016 | Abhyankar | G06F 1/185 |
| 2003/0181075 A1* | 9/2003 | Hartke | H05K 1/141 439/67 |
| 2019/0229092 A1* | 7/2019 | Ding | H01L 25/0657 |

* cited by examiner

*Primary Examiner* — Stefan Stoynov
(74) *Attorney, Agent, or Firm* — Compass IP Law PC

(57) ABSTRACT

Apparatus, assemblies, and platforms employing modular power voltage regulator (VR) modules to provide power to memory modules. A power VR module includes VR circuitry integrated on or coupled to a substrate with wiring coupling the VR circuitry to connector elements in first and second connector means. An assembly further includes a pair of memory modules (e.g., DDR) that are coupled to a power VR module via mating connector means. The connector means may be coupled using a Compression Mount Technology (CMT) connector disposed between arrays of CMT contact pads on the power VR module and the memory modules, or may comprise BGAs, PGAs, and LGAs. The power VR module receives one or more input voltages via one or both memory module and provide various output voltages to each of the memory modules to power memory devices and other circuitry on those modules.

21 Claims, 13 Drawing Sheets

*Fig. 7*

MODULAR MEZZANINE POWER VOLTAGE REGULATOR MODULE FOR MEMORY MODULES

BACKGROUND INFORMATION

Traditionally, power delivery and power management to memory modules or cards or the like has been done in one of the two ways: The required voltage regulators (VR) or power management IC (PMIC) and associated circuitry are either placed on the main system board (e.g., motherboard) or the memory module/card itself. Both approaches have significant drawbacks.

Having the VR or PMIC and associated circuit on the main system board requires extra connector pins for power rails (e.g., Vddq, Vdd2L, Vdd2H, Vdd1) instead of single Vcc power into memory devices (e.g., DIMM (Dual Inline Memory Module). It also requires extra dedicated power pins for both LP (Low Power) and DDR (Double Data Rate) memory. The connector is also unable to scale to the next generation LP/DDR module if different power rails are needed. Since the VR is locked by platform, design and cost is locked to support maximum module power load rather than scaling per configuration loaded. The VR on platform is further away from the memory devices, leading to power integrity risks.

In the traditional SoDIMM, UDIMM and other types of DRAM modules, each of the modules has its own PMIC. This increases the cost of the power delivery solution as there is a lot of redundancy of the power delivery components between multiple modules. Also, since the PMICs are tied to the DIMM/DRAM modules, there is no chance of independently upgrading the DRAM modules and not upgrading the PMIC modules.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 shows a pre-fabricated 2×LP CAMM assembly comprising two LP memory CAMMs that are fixedly-coupled to a power VR module via arrays of solder balls;

DETAILED DESCRIPTION

Figures 1A, 1B:
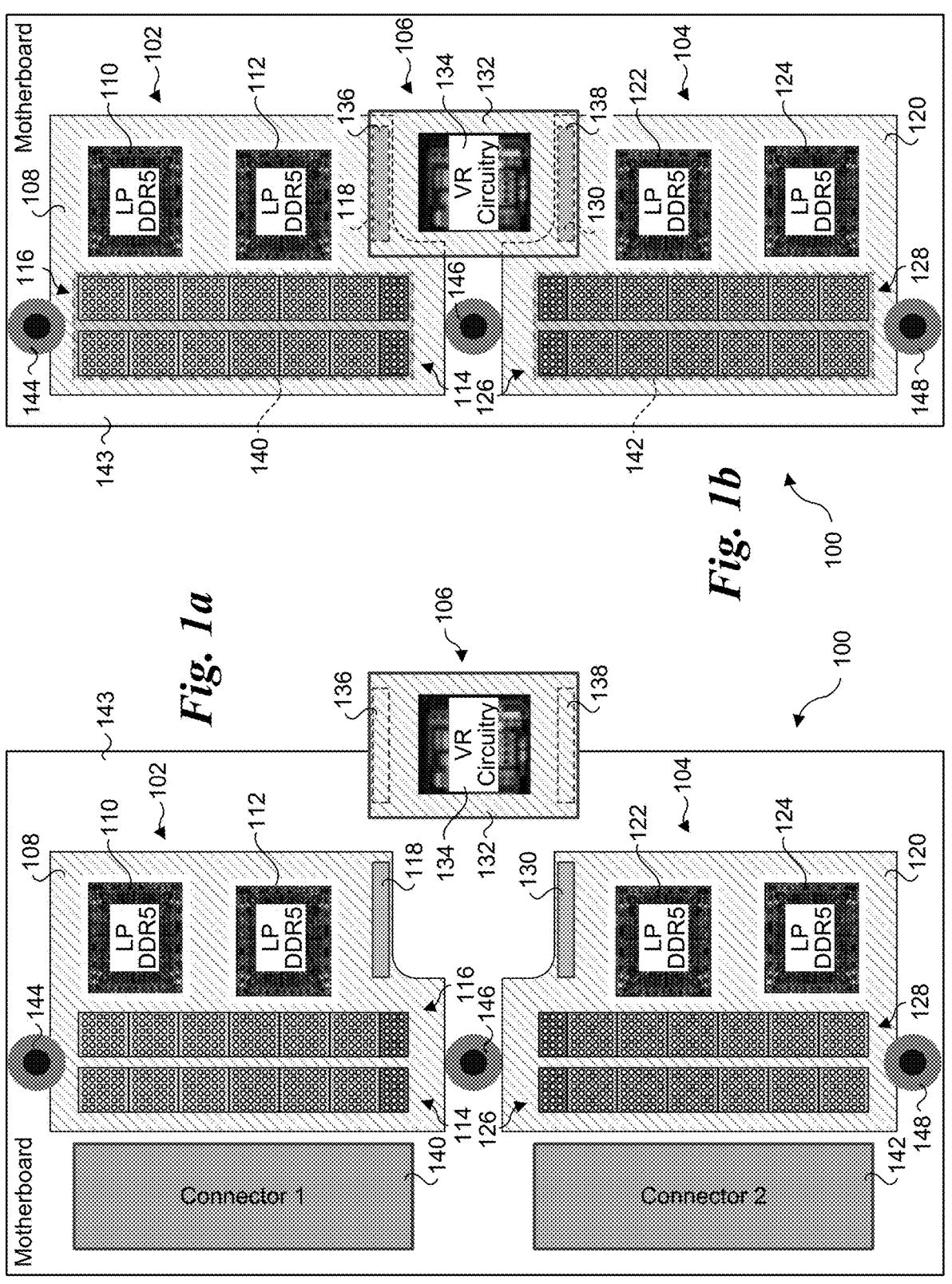
FIGS. 1a and 1b respectively show an unassembled view and assembled view of a platform includes a pair of LP memory modules that are coupled to a power voltage regulation module 106, according to one embodiment.

Embodiments of modular power voltage regulator modules to provide power to memory modules, and assemblies and platforms employing the power voltage regulator modules are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described and illustrated herein, apparatus, assemblies, and platforms employing modular power voltage regulator (VR) modules to provide power to LP and/or DDR memory modules are disclosed. The solutions enable a single power VR module to provide power to a pair of LP/DDR memory modules. Both side-by-side and stacked assembly configurations are supported, along with use of a variety of connector technologies, including use of Compression Mount Technology (CMT) connectors, Ball Grid Arrays (BGAs), Pin Grid Arrays (PGAs), Land Grid Arrays (LGAs), or other types of pin and socket type connectors.

FIGS. 1a and 1b respectively show an unassembled view and assembled view of a platform 100 including a pair of LP memory modules 102 and 104 that are coupled to a power VR module 106. LP memory module 102 includes a substrate 108 (such as a printed circuit board (PCB) to which a pair of LPDDR5 memory devices 110 and 112 are mounted, and connector means 114, 116, and 118. Similarly, LP memory module 104 includes a substrate 120 to which a pair of LPDDR5 memory devices 122 and 124 are mounted, and connector means 126, 128, and 130. Power VR module 106 comprises a substrate 132 in which voltage regulation (VR) circuitry 134 is integrated or using a separate VR module mounted to the substrate, along with a pair of connector means 136 and 138 disposed at opposite ends. Platform 100 further includes mating connector means 140 and 142 that are mounted to a motherboard 143 and fasteners 144, 146, and 148.

As shown in the assembled view of FIG. 1b, connector means 114 and 116 of LP memory module 102 are coupled to mating connector means 140 on motherboard 143, while connector means 126 and 128 of LP memory module 104 are coupled to mating connector means 142 on motherboard 143. Also, connector means 136 and 138 on power VR module 106 are respectively coupled to connector means 118 on LP memory module 102 and connector means 130 on LP memory module 104.

Generally, the LP memory devices illustrated herein may comprise an LPDDR chip or package (e.g., LPDDR5) that is mounted to a substrate (e.g., PCB board or other types of substrates with fabricated layers) via an applicable connector means. For example, in one embodiment, LP memory devices 110, 112, 122, and 124 coupled LP memory chips or packages including an BGA comprising an array of solder balls that are soldered to a mating array of BGA pads disposed below the LP memory chip or package. However, the use of BGAs is exemplary and non-limiting, as other connection technologies may be used, as would be recognized by those skilled in the art. The LP memory devices illustrated herein are also representative of DDR memory devices, more generally. Also, a given LP memory module or DDR memory module may include different numbers of memory devices with different physical sizes and/or storage capacities. As will be recognized by those skilled in the art, in addition to the illustrated memory devices, an LP or DDR memory module will include other circuitry, such as but not limited to a memory controller or the like; for simplicity and lack of space, such separate circuitry and/or components are not shown in the Figures herein.

Generally, substrates 108 and 120 include "wiring" embedded in the substrates that is used to couple connector elements for various components, such as between pads or pins on the substrates or in connectors mounted to the substrates. As used herein, "wiring" includes any means of providing conductive pathways in the substrate to connect circuitry, which may include applicable layers and vias that are not separately shown but will be understood by those skilled in the art to be present in the substrates illustrated and described herein.

The terminology "connector means" and "mating connector means" are used herein to convey various connector structures and associated technologies. For example, the connector structures described and illustrated herein may include one or more of BGAs, PGAs, LGAs and CMT connectors/assemblies. PGAs and LGAs are non-limiting examples of socketed connectors. Each of CMT, PGAs, and LGAs support replacement of components and modules, and thus an CMT, PGA, or LGA connector may be "removably coupled," while BGAs are generally considered as a permanent type of connector to "fixedly couple" components (observing, of course, components coupled using BGAs may be separated by melting the solder in the solder balls). Under the teachings and principles disclosed herein, different combinations of connectors may be used.

Generally, the connector means between a motherboard and an LP/DDR memory module will include I/O signals for communicating and controlling Read and Write access to memory devices on the modules, as well as other types of I/O signals described herein. The arrays of connector elements (e.g., CMT contacts/pins/contact pads, PGA and LGA pin, BGA solder balls and pads) may be logically and/or physically partitioned into groups when the memory controller interface to an LP/DDR memory module supports multiple memory channels. For example, the connector element arrays in some of the Figures herein support two or four channel interfaces. Thus, "one or more arrays" may be used to describe arrays that are used for coupling I/O signals for one or more memory channels, in some embodiments. Meanwhile, connector elements used to couple input voltages (to the LP/DDR memory module) and other I/O signals may be separate from the I/O signals used for the memory channels, or may be part of the group of connector elements for a given memory channel.

Figures 2A, 2B:
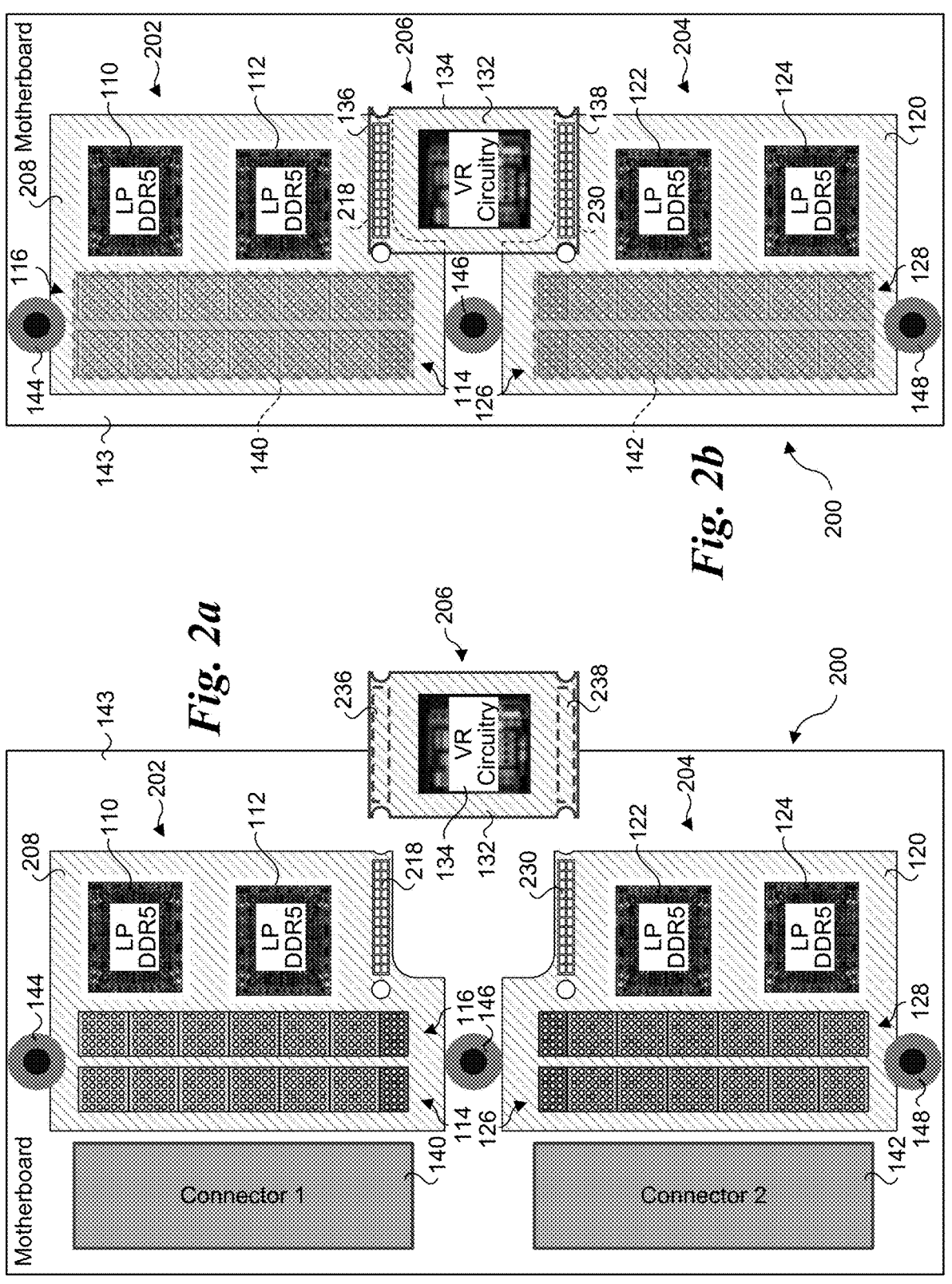
FIGS. 2a and 2b respectively show before and after assembly configurations for a platform in which Compression Mount Technology (CMT) connector technology is used to couple voltage and I/O signals between LP memory modules and a CAM (Compression Attached Module) power VR module, according to one embodiment.

FIGS. 2a and 2b show before and after assembly configurations for a platform 200 in which CMT connector technology is used to couple voltage and I/O (Input/Output) signals between LP memory modules 202 and 204 and a CAM (Compression Attached Module) power VR module 206. Generally, components that share the same reference numbers in the Figures herein are the same of similar and perform similar functions. Thus, components and circuit elements sharing the same reference numbers in FIGS. 1a, 1b, 2a and 2b are the same or similar. Accordingly, the following description focuses on the differences shown in FIGS. 2a and 2b.

As shown in FIG. 2a, an array 218 of CMT contact pads is formed on the surface of substrate 208, while a similar array 230 of CMT contact pads is formed on the surface of substrate 120. In this non-limiting example, arrays 218 and 230 are 2×12; however, arrays having other configurations, including less or more contact pads may be implemented. In one embodiment, matching arrays 236 and 238 of CMT contact pads are formed on the underside surface of substrate 132 of CAM power VR module 206. In another embodiment described and illustrated in further detail in FIGS. 8a-8e below, arrays 236 and 238 are representative of arrays of CMT contact pads used with CMT connectors.

Figures 3A, 3B:
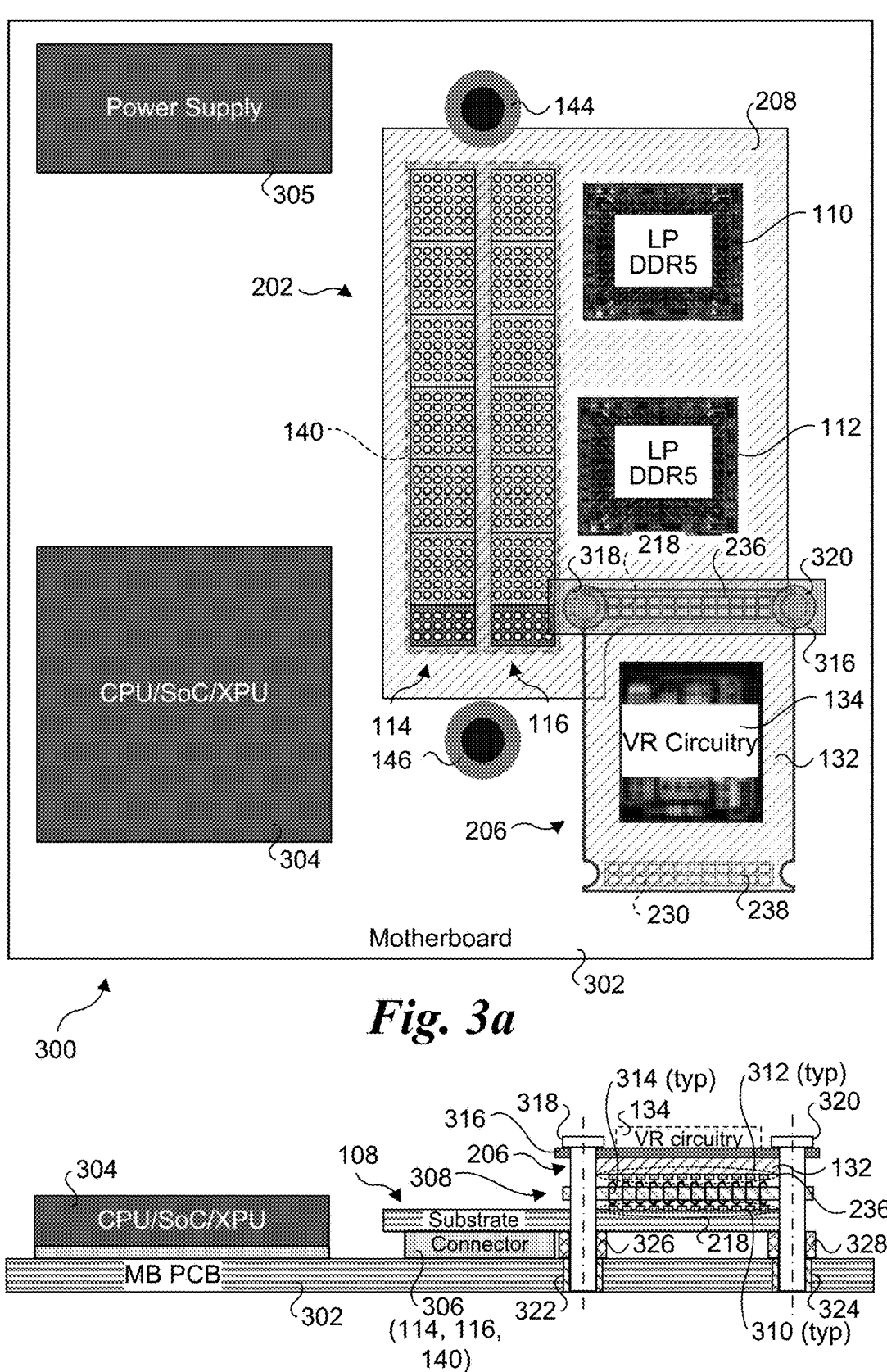
FIGS. 3a and 3b respectively show a plan view and cross-section view of an assembled platform employing a first type of CMT connector technology.

FIGS. 3a and 3b respectively show a plan view and cross-section view of an assembled platform 300 employing a first type of CMT connector technology. Platform 300 includes a motherboard 302 to which a CPU (Central Processing Unit), System on a Chip (SoC) or "other processing unit" (XPU) 304 is mounted. Generally, CPU/SoC/XPU is an integrated circuit (IC) or package including one or more dies that is packaged with a connector means, such as a BGA, PGA, or LGA. A PGA employs an array of pins extending downward from the bottom of the IC/package, while an LGA has an array of contacts on the underside of the IC/package. Generally, LGA packages are designed to fit either in a socket, or be soldered down to a substrate or PCB using surface mount technology. In contrast, PGA packages cannot be soldered down using surface mount technology; rather the pins on a PGA package are mounted to PCBs using a through hole method or using a socket that is mounted to the PCB. For a BGA, an array of solder balls is disposed on the underside of the IC/package. As an option, various types of interposers with applicable connectors may also be used to CPU/SoC/XPU 304 to motherboard 302, as will be known to those skilled in the art.

A power supply 305, which may be coupled to or separate from motherboard 302, provides power to various components and circuitry in platform 300, including providing one or more voltage inputs to motherboard 302. In one embodiment, motherboard 302 comprises a PCB including embedded wiring coupling connector elements for CPU/SoC/XPU 304 with corresponding connector elements (e.g., BGA/PGA/LGA pads, pins, or socket receivers) for connector 140. Motherboard 302 also includes wiring coupling ground and one or more voltage outputs of power supply 305 to connector elements on connector 140. Generally, output voltages for power supply 305 may be coupled directly to motherboard 302 or one or more connectors may be used.

Substrate 208 of LP memory module 202 is coupled to motherboard 302 via a connector 306, which is generically representative of various types of connector technologies including BGAs, PGAs, LGAs, and CMT connector technologies. As applied to the configuration in FIGS. 1a, 1b, 2a, and 2b, connector 306 includes connector means 114 and 116 disposed on the underside of substrate 208 and connector 140, which would be disposed on the topside of motherboard 302.

As shown in the cross-section view of FIG. 3b, the CMT connector technology includes a CMT connector 308 that is disposed between an array 218 of CMT contact pads 310 disposed on the top surface of substrate 208 and an array 236 of CMT contact pads 312 disposed on the underside of board 132 for CAM power VR module 206. CMT connector 308 includes an array of spring-loaded CMT contacts or pins 314, where each CMT contact or pin is coupled at opposing ends to a CMT contact pad 310 and a CMT contact pad 312. Further details of exemplary CMT connectors and contact/pins are shown in FIG. 8a-8e and discussed below.

As its name implies, CMT connectors operate by compressing the CMT contacts/pins against the CMT contact pads. This is accomplished by providing forces to push the substrates 218 and 132 toward each other. In this example, this is accomplished using a bolster plate 316 and pair of fasteners 318 and 320 that are coupled to motherboard 302 (as shown in FIG. 3b) or to substrate 208 (not shown). For example, a pair of threaded inserts such as Keenserts® or the like are pushed into holes in motherboard 302 and threaded ends of fasteners 318 and 320 are threaded into the threaded insert. This pushes bolster plate 316 toward the topside of motherboard 302, which in turn pushes substrate 132 toward substrate 208, with the result being compression of CMT contacts/pins against CMT contact pads 310 and 312. As further shown, the assembly may employ a pair of spacers 326 and 326 to maintain the distance of substrate 208 above motherboard 302.

Figure 11:
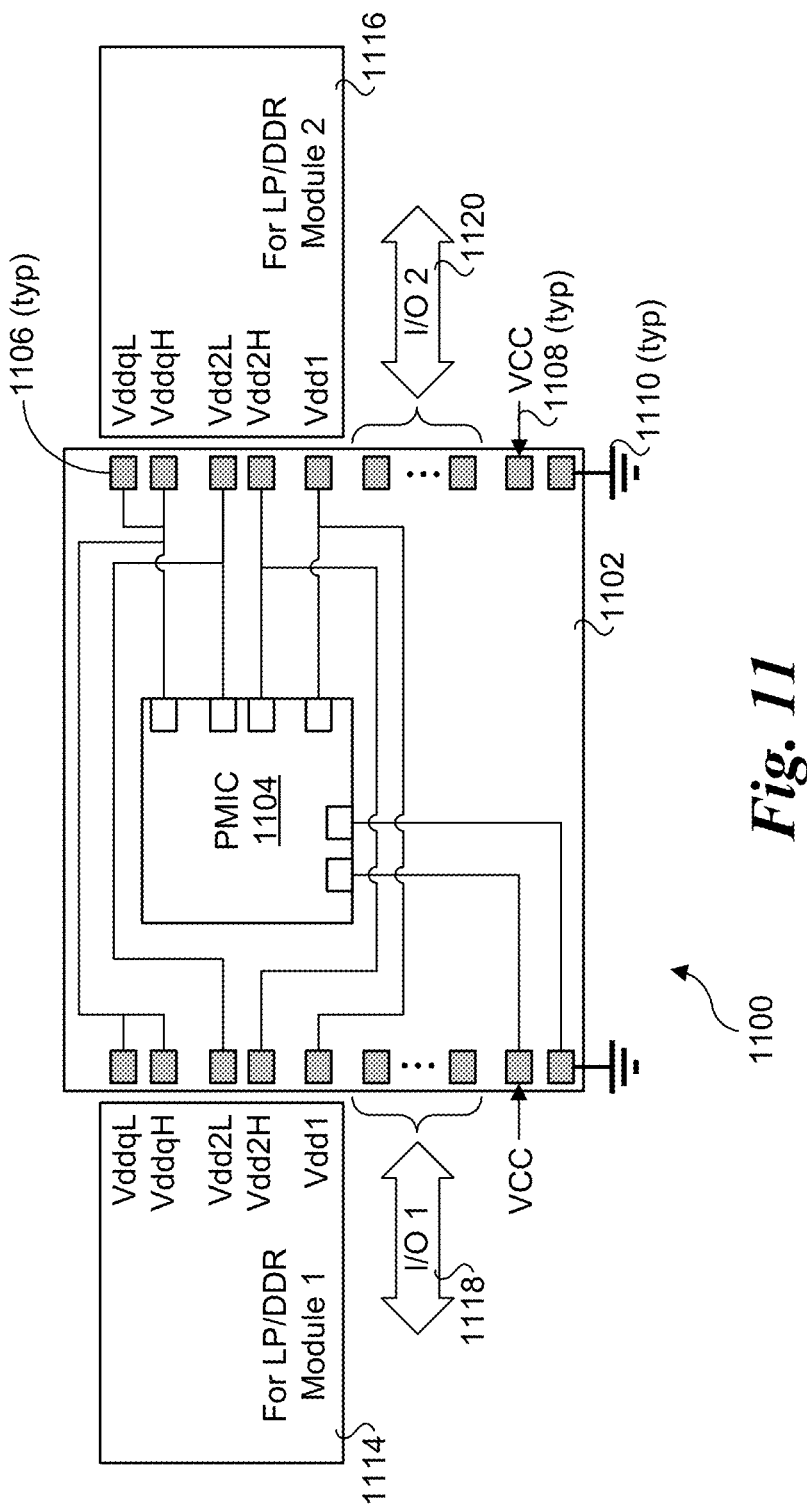
FIG. 11 is a diagram illustrating selective components, voltages, and I/O signals for a power VR module, according to one embodiment.

Generally, multiple connector elements (e.g., pins/pads) in connector 140 will be used to provide ground and one or more input voltages to LP memory module 202 via connector means 114 and 116. In turn, connector elements in one or both of connector means 114 and 116 will be coupled to CMT contact pads 310. When assembled, voltages applied at CMT contact pads 310 will be coupled to contact pads 312 on substrate 132 via CMT contacts/pins 314 to provide input voltage(s) and ground to VR circuitry 134 on CAM power VR module 206. VR circuitry 134 will include one or more regulated output voltages that are provide as voltage inputs to LP memory module 202 via connections facilitated via CMT connector 308 and CMT contact pads 310 and 312. Non-limiting examples of the input and output voltages are shown in FIG. 11 described below.

Figures 4A, 4B:
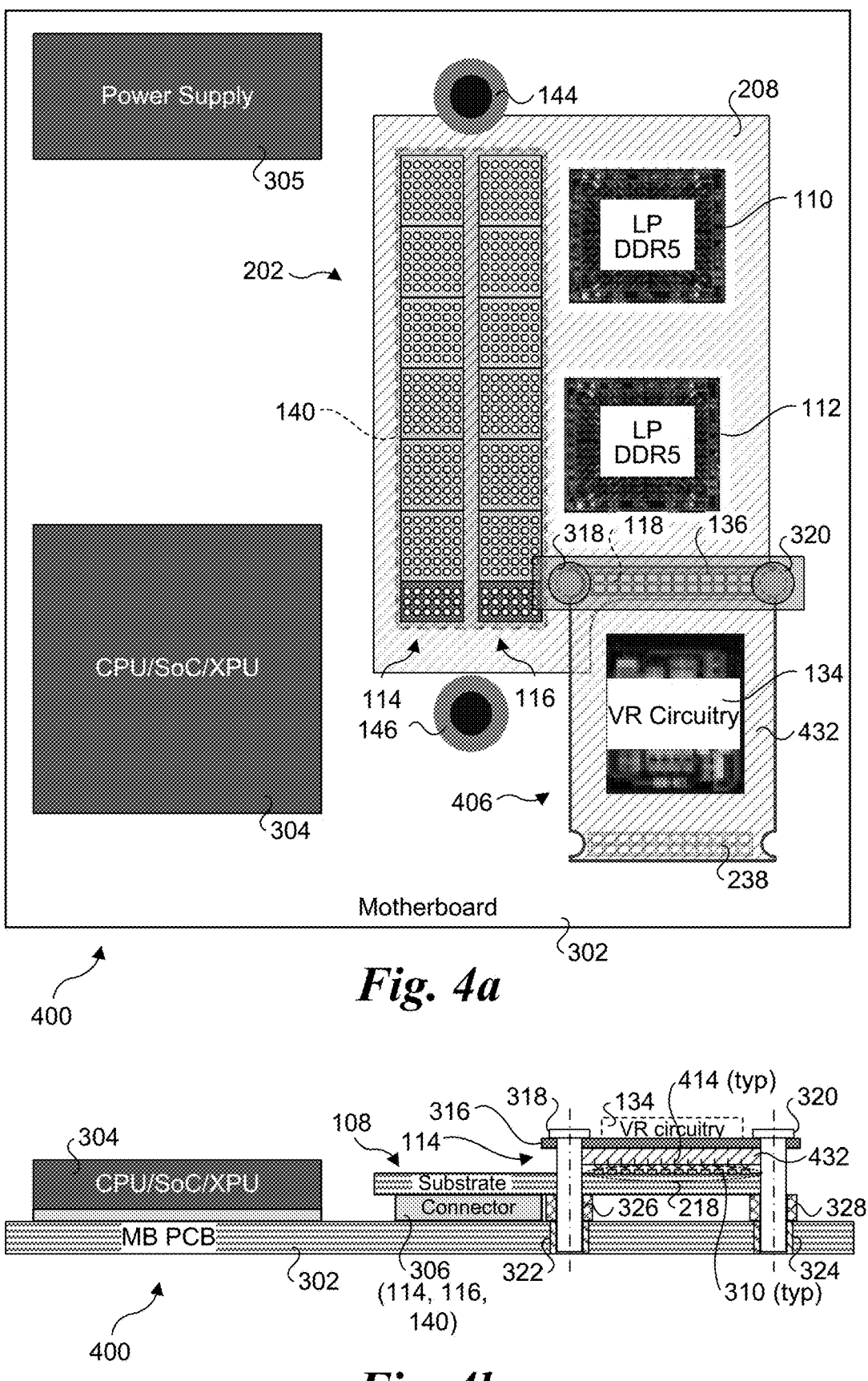
FIGS. 4a and 4b respectively show a plan view and cross-section view of an assembled platform employing a second type of CMT connector technology, according to one embodiment.

FIGS. 4a and 4b respectively show a plan view and cross-section view of an assembled platform 400 employing a second type of CMT connector technology. As shown by components and elements with like-numbered references in FIGS. 3a, 3b, 4a, and 4b, most of the components and elements are the same or similar for platforms 400 and 300. The primary difference is that under platform 400, an array of spring-loaded CMT contacts 414 is embedded in a substrate 432 for a CAM power VR module 406. The spring-loaded CMT contacts 414 are compressed against respective CMT contact pads 310 disposed on the top surface of substrate 208. An advantage of the CMT connector structure used in platform 400 is the stack height is reduced. On the other hand, the CMT connector structure used in platform 300 may employ an off-the-shelf CMT connector or a custom CMT connector manufactured by a CMT vendor.

Figures 5A, 5B:
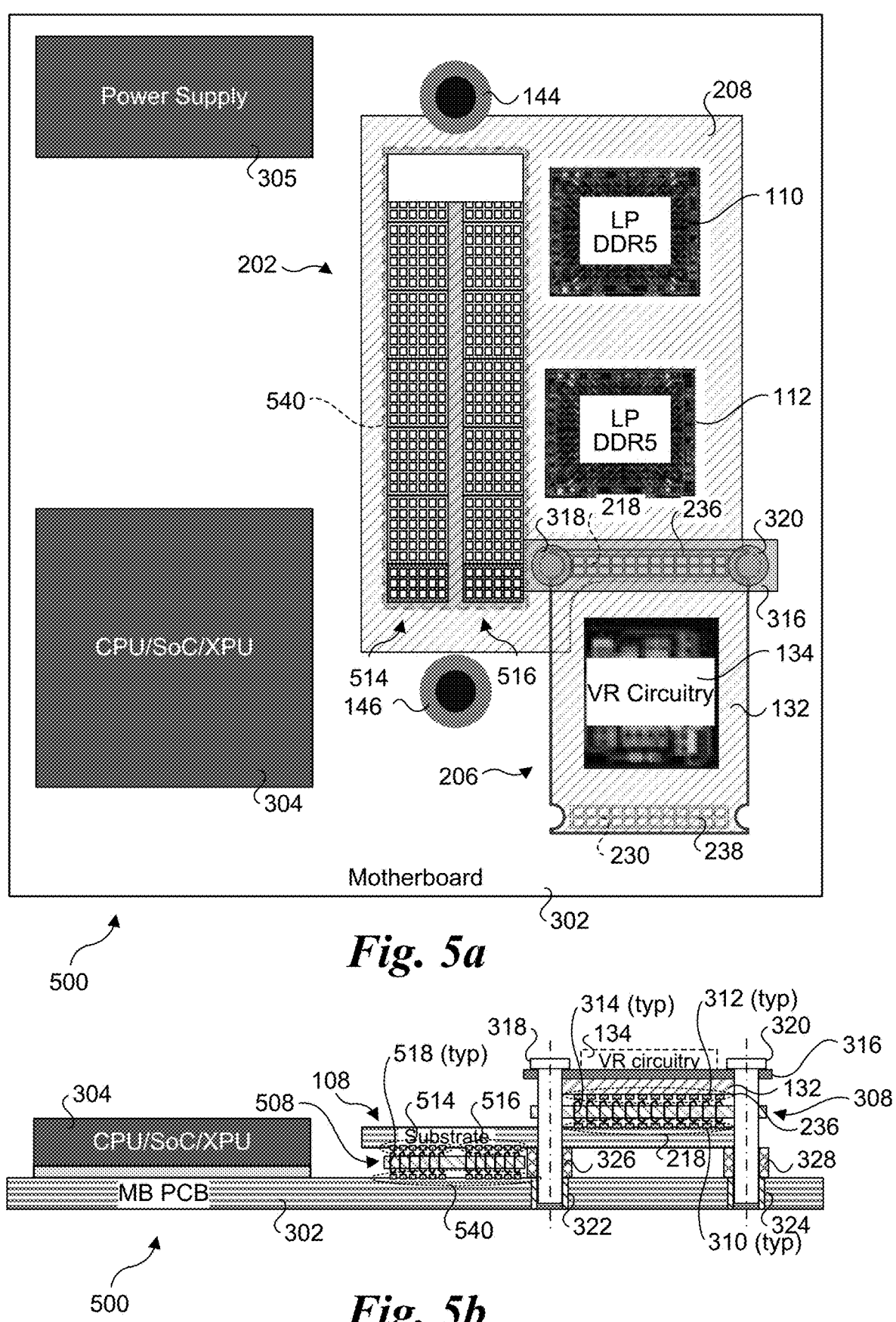
FIGS. 5a and 5b respectively show a plan view and cross-section view of an assembled platform employing the first type of CMT connector technology for coupling LP memory modules to a motherboard, according to one embodiment.

FIGS. 5a and 5b respectively show a plan view and cross-section view of an assembled platform 500 employing the first type of CMT connector technology for coupling LP memory modules 202 (shown) and 204 (not shown, see FIGS. 2a and 2b above) to motherboard 302. As shown by like-numbered references in FIGS. 3a, 3b, 5a, and 5b, most of the components and elements are the same or similar for platforms 500 and 300. Arrays 514 and 516 of CMT contact pads are formed on the underside of substrate 208, while arrays 540 of CMT contact pads have a matching pattern are formed on the topside of motherboard 302. A CMT connector 508 having an array of CMT contacts or pins 518 is disposed between substrate 208 and motherboard 302.

In the illustrated example of FIGS. 5a and 5b, the first type of CMT connector technology is used for coupling signals and voltages between the LP memory modules 202 and 204 and CAM power VR module 206. In a manner like that shown in FIGS. 4a and 4b, the second type of CMT connector technology may also be used for coupling signals and voltages between the LP memory modules 202 and 204 and CAM power VR module 406. In addition, the second type of CMT connector technology may also be used for coupling input voltages and signals between LP memory modules 202 and 204 and motherboard 302. In addition, in FIGS. 5a and 5b VR circuitry 134 is depicted as residing above substrate 132. However, in other embodiments herein, including the embodiment of FIGS. 5a and 5b VR circuitry may be flipped vertically relative to that shown, where the VR circuitry is on the same side of the substrate 132 as CMT contacts 236 and 238.

Figures 6A, 6B:
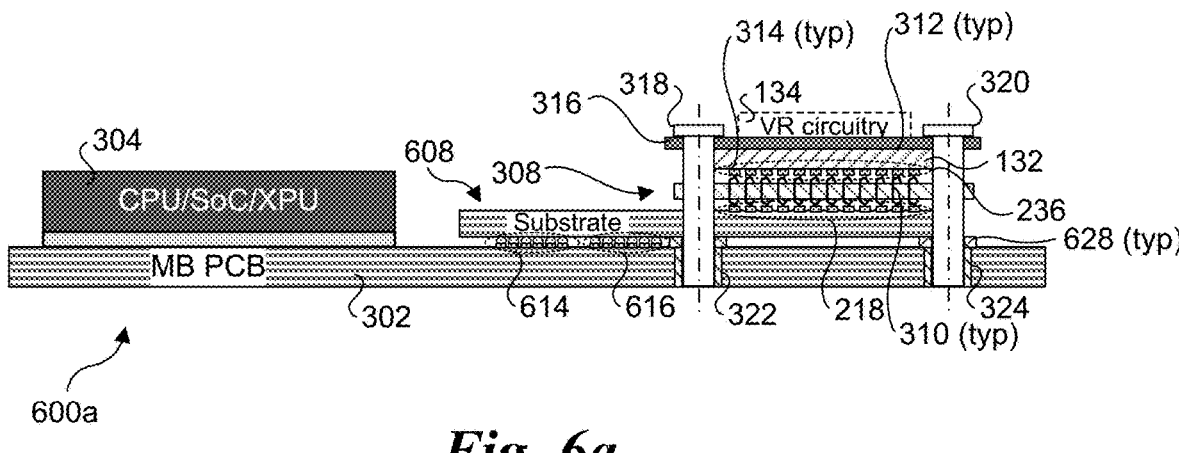
FIG. 6a shows a cross-section view of a platform employing BGAs between LP memory modules and a motherboard using the CMT connector structure of FIGS. 4a and 4b, according to one embodiment.
FIG. 6b show a cross-section view of a platform employing BGAs between LP memory modules and a motherboard using the CMT connector structure of FIGS. 5a and 5b, according to one embodiment.

FIGS. 6a and 6b show cross-section views platforms 600a and 600b employing BGAs 614 and 616 between a substrate 608 of an LP memory module and motherboard 302. In the illustrated embodiment, BGAs 614 and 616 are representative of BGAs that may be integrated into substrate 608, with the solder balls disposed underneath the substrate. Accordingly, there would be matching arrays of BGA pads disposed on the top surface of motherboard 302. During a manufacturing operation, applicable platform components are heated in an oven or the like until the BGA solder balls melt, resulting in solder balls being soldered onto respective BGA pads.

Figure 7:
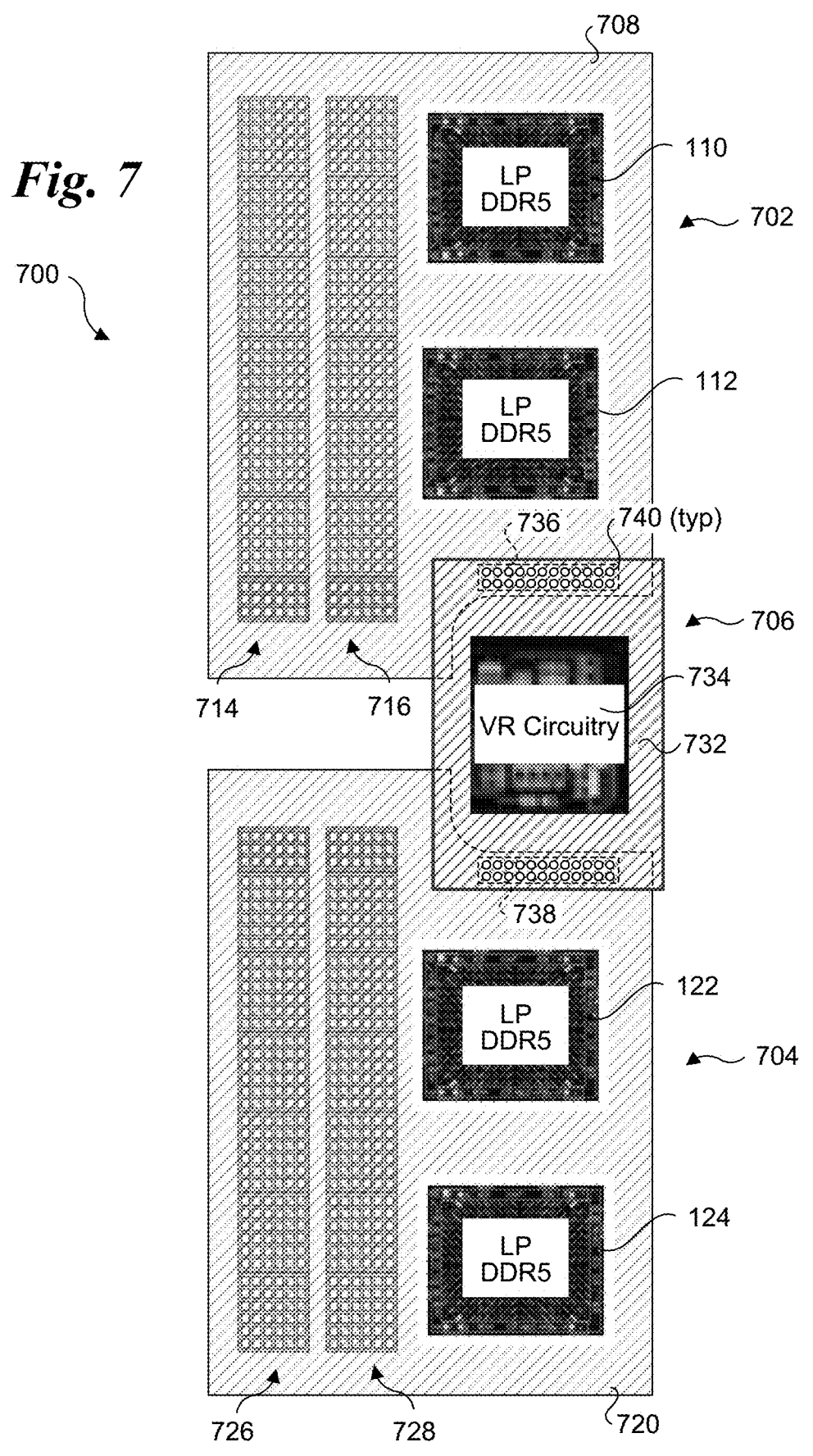

FIG. 7 shows a pre-fabricated 2×LP CAMM assembly 700 comprising two LP memory CAMMs 702 and 704 that are fixedly-coupled to a power VR module 706 via arrays 736 and 738 of solder balls 740. LP memory CAMM 702 includes a pair of LP memory devices 110 and 112 that are coupled to a substrate 708. Arrays of CMT contact pads 714 and 716 are disposed on the underside of substrate 708. LP memory CAMM 704 has a similar configuration, including a substrate 720 to which LP memory devices 122 and 124, and arrays of CMT contact pads 726 and 728 disposed on the underside of substrate 720. Power VR module 732 includes a substrate 732 and VR circuitry 734.

In one embodiment, arrays 736 and 738 of solder balls 740 include BGAs. Generally, the BGAs may be integrated into either substrate 732 or on substrates 708 and 720. The substrate(s) without an integrated BGA(s) will include arrays of BGA pads matching the arrays in the BGAs. When assembled with a motherboard (not shown), one or more CMT connectors would be disposed between the arrays of CMT contact pads 714, 716, 726, and 728 and matching arrays of CMT contact pads on the motherboard.

Figures 8A, 8B, 8C:
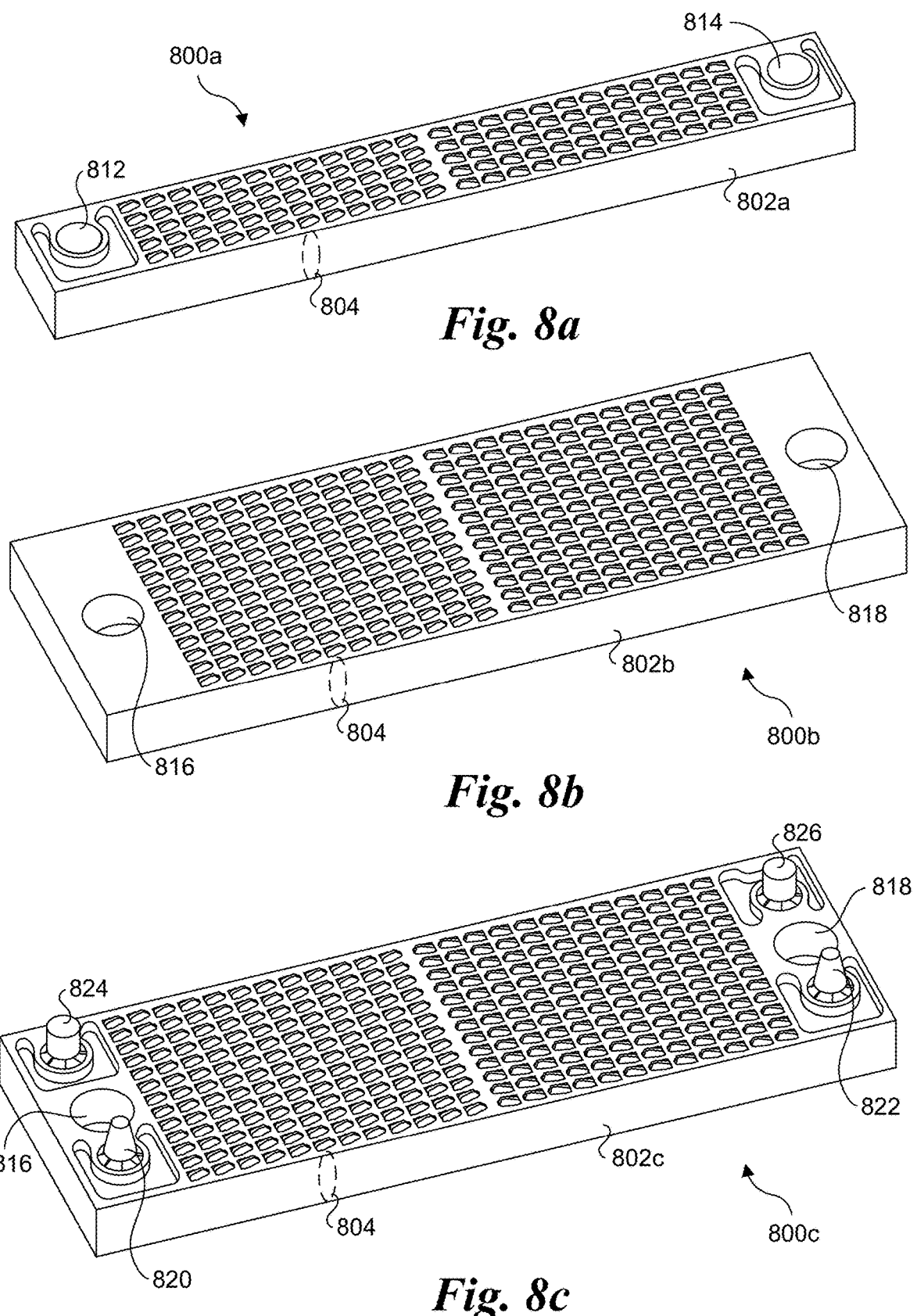
FIG. 8a shows a 3D view of a CMT connector, according to a first embodiment.
FIG. 8b shows a 3D view of a CMT connector, according to second embodiment.
FIG. 8c shows a 3D view of a CMT connector, according to a third embodiment.
Figure 8D:
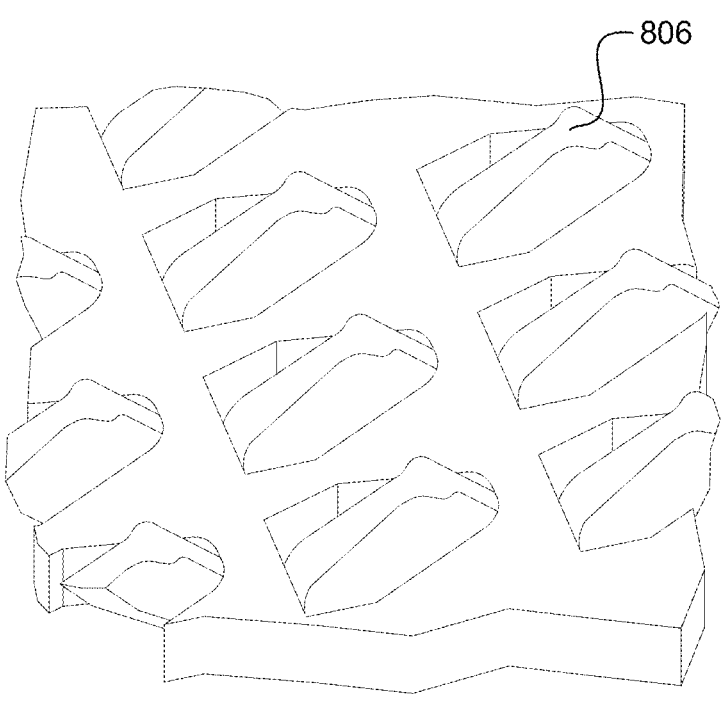
FIG. 8d shows a close-up view of the top of the spring contact structure used for the CMT pins.
Figure 8E:
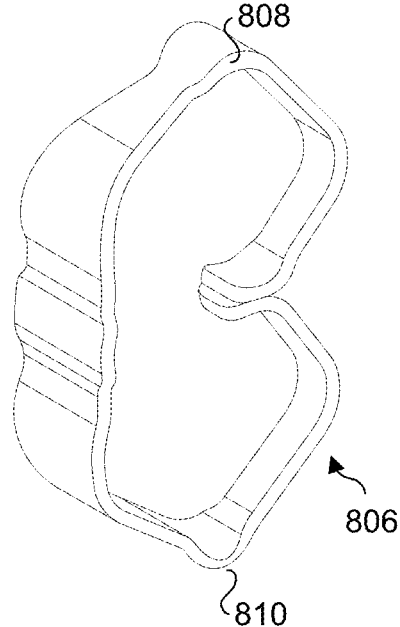
FIG. 8e shows a 3D view of a spring contact used for the CMT pins, according to one embodiment.

FIGS. 8a, 8b, and 8c show three-dimensional (3D) views of CMT connector 800a, 800b, and 800c, according to respective embodiments. CMT connectors 800a, 800b, and 800c are generally illustrative of the CMT connectors described and illustrated herein and includes a body 802 (802a, 802b, and 802c) in which arrays of spring-loaded CMT pins or contacts 804 are installed. CMT connector 800b shows an example of a CMT connector with a larger number of spring-loaded CMT pins or contacts 804. As shown in FIGS. 8d and 8e, in one embodiment the spring-loaded CMT pins include a pair of spring contacts 806 that are installed in opposing ends of tubes (not shown) that are compressed when CMT connector 800a (or 800b or 800c) is installed in a platform such as illustrated in the foregoing platform embodiments. As shown in FIG. 8e, a spring contact 806 comprises a bent structure made of a suitable metal and includes a pair of lobes 808 and 810; when two spring contacts 806 are installed in a tube and the components in a CMT assembly are installed, lobe 808 will contact a CMT contact pad on a first substrate while lobe 810 will contact a contact pad in an array of CMT contact pads on a second substrate. The tubes are disposed in respective holes in body 802.

Under an alternative configuration, a CMT connector may employ spring-loaded contacts that comprise a single member made of a suitable metal. The spring-loaded contacts may be embedded in the body of a CMT connector when formed, or inserted into suitable holes or apertures formed in the CMT connector body during a separate manufacturing operation.

As shown in FIG. 8a, CMT connector 800a further includes a pair of holes 812 and 814, which are sized to fit the diameter of the shoulders of fasteners used in the assemblies. This is used to align the CMT connector pins/contacts with corresponding CMT contact pads on the substrate and interposer. Similarly, CMT connector 800b in FIG. 8b includes a pair of holes 816 and 818.

In some installations, it may be advantageous to include separate guide pins and/or dowels to align the CMT connector pins/contacts with corresponding CMT contact pads on the substrate and interposer. An example of this is shown for CMT connector 800c in FIG. 8c, which includes guide pins 820, 822, and dowels 824, and 826. When guide pins and/or dowels are used, the guide pins and fasteners may also be used for alignment purpose (such as two guide pins and two fasteners).

Stacked Assemblies

Figures 9A, 9B, 9C:
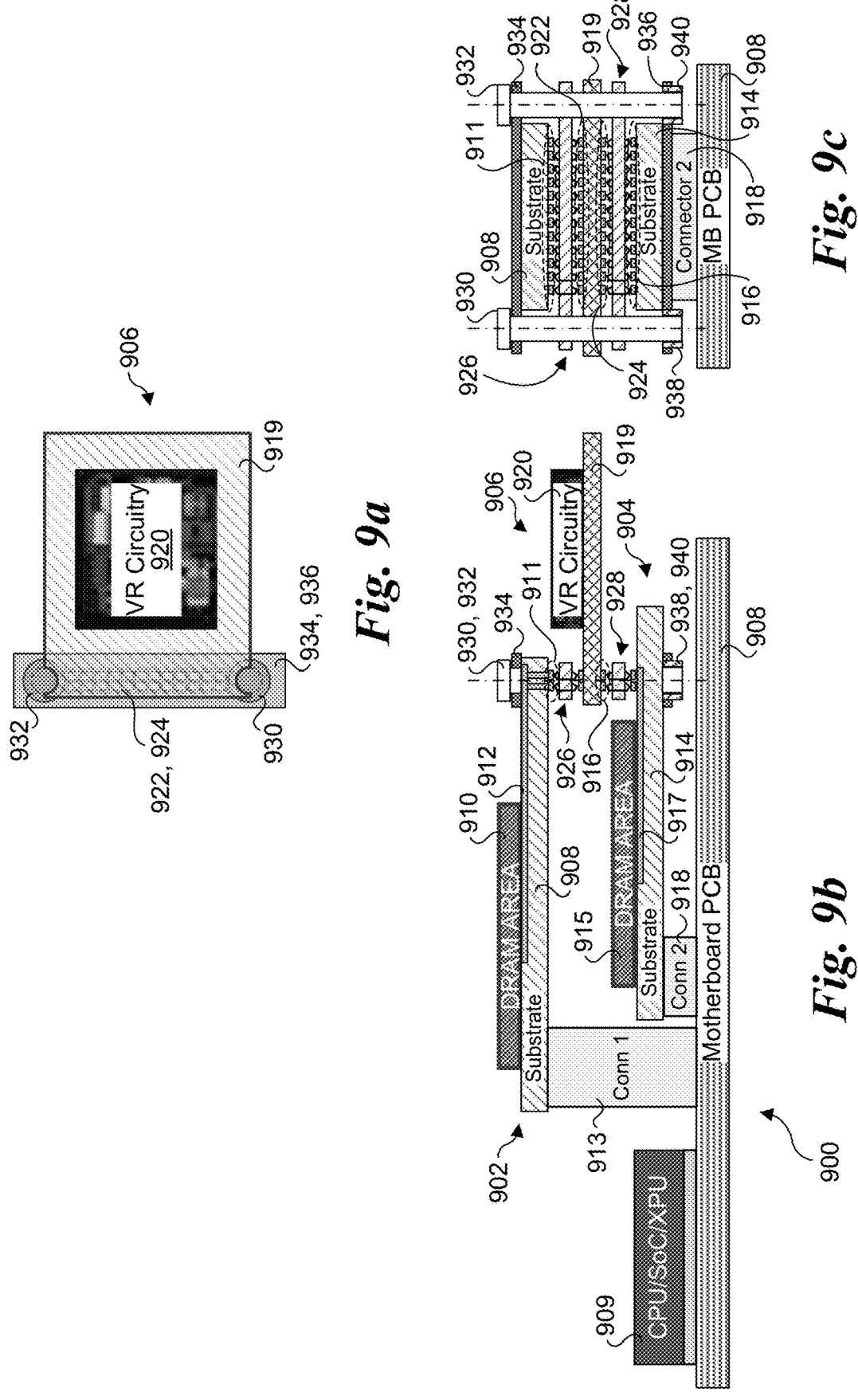
FIG. 9a shows a plan view of a power VR module used in the stacked assembly of FIGS. 9b and 9c.
FIGS. 9b and 9c respectively show side and end cross-section views of a stacked assembly including a pair of DDR memory modules coupled to a power VR module using a pair of CMT connectors; according to one embodiment.

In addition to side-by-side LP and DDR memory board configurations, assemblies having stacked configurations are also provided. An example of a platform 900 employing a stacked assembly is shown in FIGS. 9b and 9c. Platform 900 includes a pair of LP or DDR (LP/DDR) memory modules 902 and 904, a CAM power VR module 906, a motherboard 908, and a CPU/SoC/XPU 909. LP/DDR memory module 902 includes a substrate 908 to which LP or DDR memory chips/packages are coupled, as depicted by a DRAM area 910. An array of CMT contact pads 911 is disposed on the underside of substrate 908, which includes wiring 912 coupling CMT contact pads 911 to connection elements for the DDR memory chips/packages on LP/DDR memory module 902. Substrate 908 is coupled to motherboard 908 via a connector 913.

LP/DDR memory module 904 includes a substrate 914 to which LP or DDR memory chips/packages are coupled, as depicted by a DRAM area 915. An array of CMT contact pads 916 is disposed on the topside of substrate 914, which includes wiring 917 coupling CMT contact pads 916 to connection elements for the DDR memory chips/packages for LP/DDR memory module 904. Substrate 914 is coupled to motherboard 908 via a connector 918.

Generally, connectors 913 and 918 are generically representative of various types of connectors with or without additional components such as interposers (not shown), such as CMT connectors, PGAs and LGAs. In one embodiment, CMT connector assemblies are used for connectors 912 and 916 (separate details not shown in FIGS. 9b and 9c).

FIG. 9c shows a cross-section end view of platform 900, while FIG. 9a shows a plan view of CAM power VR module 906 and selected associated CMT assembly components. CAM power VR module 906 includes a substrate 919 to which VR circuitry 920 is mounted/coupled. Arrays 922 and 924 of CMT contact pads are respectively disposed on the top and bottom sides of substrate 919. The stacked assembly include two CMT connectors 926 and 928, where CMT connector 926 is disposed between substrate 908 and the topside of substrate 919, while CMT connector 928 is disposed between the underside of substrate 919 and the topside of substrate 914.

The CMT connector components are held together in compression using a clamp assembly including a pair of fasteners 930 and 932, and upper and lower bolster plates 934 and 936. In the illustrated embodiment, lower bolster plate 936 includes a pair of threaded inserted 938 and 940 in which threaded ends of fasteners 930 and 932 are threaded. Optionally, separate nuts may be used in place of threaded inserted 938 and 940. In the illustrated embodiment, alignment of the CMT contacts and CMT contact pads is achieved using holes and/or arced notches in substrates 908, 919, and 914 the bodies of CMT connectors 926 and 928.

Figure 10:
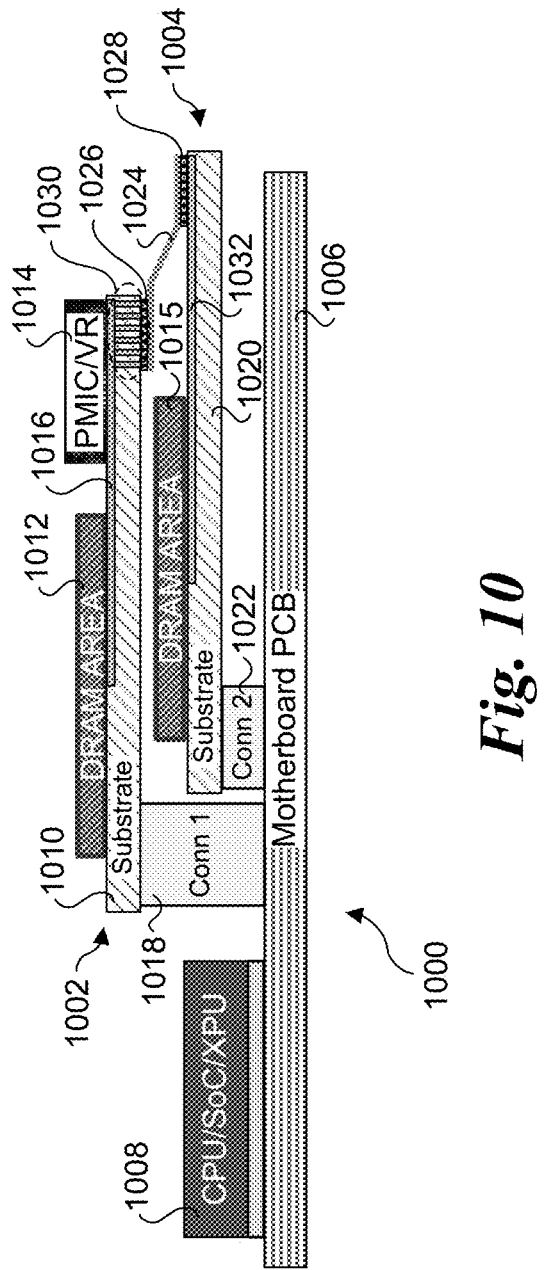
FIG. 10 shows a cross-section view of a stacked assembly including a first DDR memory module with on-board power VR circuitry coupled to a second DDR memory module with a flexible connection; according to one embodiment.

FIG. 10 shows a platform 1000 employing a stacked assembly include a LP/DDR memory module with an on-board power management circuitry that is used to provide power to a second LP/DDR memory module via a flex connection. Platform 1000 includes LP/DDR memory modules 1002 and 1004, a motherboard 1006, and a CPU/SoC/XPU 1008. LP/DDR memory module 1002 includes a substrate 1010 to which LP or DDR memory chips/packages are coupled, as depicted by a DRAM area 1012, on-board power management circuitry 1014, and wiring 1016 coupling the various inputs and output voltages provided my power management circuitry 1014 to circuitry for LP/DDR memory module 1002. Substrate 1010 is coupled to motherboard 1006 via a connector 1018.

LP/DDR memory module 1004 includes a substrate 1020 to which LP or DDR memory chips/packages are coupled, as depicted by a DRAM area 1022, and is coupled to motherboard 1006 via a connector 1022. A flex connection 1024 is coupled between a flex connector interface 1026 on the underside of substrate 1010 and a connector flex interface 1028 on the topside of substrate 1020. Flex connector interface 1024 is coupled to power management circuitry 1014 via wiring 1030 in substrate 1010, enabling power (input voltages) to be provided via flex connector 1024, flex connector interface 1028 and wiring 1032 in substrate 1020 to various circuitry and components on LP/DDR memory module 1004, including the LP or DDR memory chips/packages.

FIG. 11 shows an example of the VR and power management circuitry for a CAM power VR module 1100, according to one embodiment. Power VR module 1100 includes a substrate 1102 to which various circuitry is integrated and/or mounted, including a PMIC 1104. Voltages and I/O signals for selected CMT contact pads 1106 in arrays of CMT contact pads disposed on a surface of the substrate toward the left and right edges are also shown. As will be recognized by those skilled in the art, a Power VR module with a PMIC would include additional circuitry and components coupled to the PMIC that are not shown for simplicity and point of illustration.

PMIC 1104 receives a VCC input voltage 1108 and is coupled to ground 1110 (e.g., in one embodiment substrate 1102 may include a ground plane or the like). The VCC input voltage may be provided from one or both of the LP/DDR memory modules, depending on the implementation design and the power requirements. VCC will be provided from the motherboard, either directly from the power supply or from a separate VR module or the like not separately shown in the Figures herein. A small portion of the connector elements on one or both of the LP/DDR memory modules will be used for coupling VCC from the motherboard into the memory module substrates, which, in turn will be routed to one or more CMT contact pads. Similarly, a small portion of the connector elements for the LP/DDR memory modules will be used for coupling ground 1110 from the motherboard.

PMIC 1104 is depicted as providing exemplary output voltages at respective sets of CMT contact pads 1106 that are received by the pair of LP/DDR memory modules, as depicted by output voltages 1114 (for LP/DDR module 1) and output voltages 1116 (for LP/DDR module 2). These output voltages may also be referred to as power rails. Generally, a portion of the output voltages will be used to power the LP/DDR memory devices, while other output voltages may be used by other circuitry on the LP/DDR memory modules. Depending on the type of LP/DDR memory devices used, these output voltages may vary. For example, LPDDR5 memory devices uses less power than DDR5 or DDR6 memory devices, and generally operate at lower voltages.

The particular sets of voltage labels shown are exemplary and non-limiting; as will be recognized by those skilled in the art, a power VR module may be customized to supply output voltages to meet the requirements for a given implementation. Non-limiting examples of voltages include 0.3/0.5V for VddqL and VddqH, 0.9V for Vdd2L, 1.1V for Vdd2H, and 1.8V for Vdd1. Under another embodiment, voltage rails provided to DDR5 memory devices include a 1.1V VDD rail, a 1.1V VDDQ rail, and a 1.8V VPP rail. Separate voltage rails are used for logic on the DDR5 memory module, including a VOUT_1.8V LDO rail and a VOUT_1.0V LDO rail.

Generally, one or more I/O signals will be used to support communication between PMIC 1104 and power management logic on the LP/DDR memory modules, as depicted by I/O signals 1116 for LP/DDR memory module 1 and I/O signals 1118 for LP/DDR. All or a portion of these signals would be coupled to PMIC 1104 (wiring not separately shown), while some I/O signals may be coupled to other logic on a power VR module (not separately shown). Generally, the I/O signals may employ an applicable communication protocol, such as but not limited to $I^2C$ or $I^3C$. Single-ended, differential, and/or clock+data I/O signals may be used.

In addition to I/O signals for communication with the LP/DDR memory modules, as portion of the I/O signals may be used to communicate with an CPU/SoC/XPU on the motherboard. For example, a CPU or SoC may support multiple sleep states having different levels of power consumption, including memory sleep states. To effect such sleep states, the CPU or SoC may sends a sleep state command or message over an applicable I/O channel or interface via an LP/DDR module to PMIC 1104. In turn, PMIC 1104 may reduce one or more of its power outputs. PMIC 1104 will/may also provide I/O signals to the LP/DDR memory modules to switch to the applicable sleep state modes. Applicable I/O signals may also be used to switch operation back to an active state.

Figure 12:
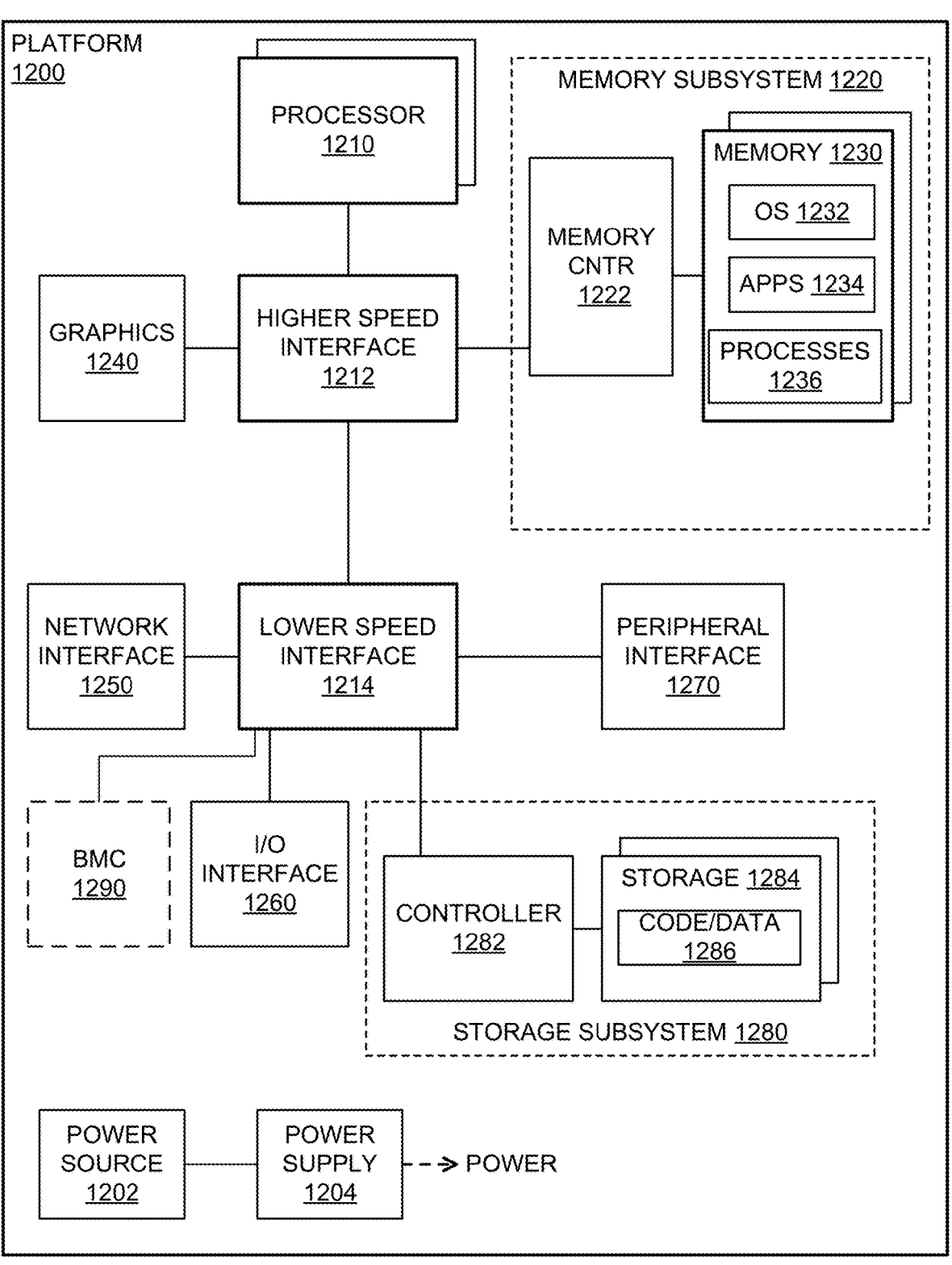
FIG. 12 shows a block diagram of an exemplary compute platform in which embodiments described and illustrated herein may be implemented.

FIG. 12 illustrates an example compute platform 1200 in which aspects of the embodiments may be practiced. Compute platform 1200 represents a computing device or computing system in accordance with any example described herein, and can be a server, laptop computer, desktop computer, or the like. More generally, compute platform 1200 is representative of any type of computing device or system employing a power VR module and LP/DDR memory modules.

Compute platform 1200 includes a processor 1210, which provides processing, operation management, and execution of instructions for compute platform 1200. Processor 1210 can include any type of microprocessor, CPU, GPU, processing core, or other processing hardware to provide processing for compute platform 1200, or a combination of processors. Processor 1210 controls the overall operation of compute platform 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute platform 1200 includes interface 1212 coupled to processor 1210, which can represent a higher speed interface or a high throughput interface for system components that needs higher bandwidth connections, such as memory subsystem 1220 or graphics interface components 1240. Interface 1212 represents an interface circuit, which can be a standalone component or integrated onto a processor die. Where present, graphics interface 1240 interfaces to graphics components for providing a visual display to a user of compute platform 1200. In one example, graphics interface 1240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1240 generates a display based on data stored in memory 1230 or based on operations executed by processor 1210 or both.

Memory subsystem 1220 represents the main memory of compute platform 1200 and provides storage for code to be executed by processor 1210, or data values to be used in executing a routine. Memory 1230 of memory subsystem 1220 may include one or more memory devices such as LP/DDR DRAM chips/packages, read-only memory (ROM), flash memory, or other memory devices, or a combination of such devices. Memory 1230 stores and hosts, among other things, operating system (OS) 1232 to provide a software platform for execution of instructions in compute platform 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for compute platform 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

While not specifically illustrated, it will be understood that compute platform 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus.

In one example, compute platform 1200 includes interface 1214, which can be coupled to interface 1212. Interface 1214 can be a lower speed interface than interface 1212. In one example, interface 1214 represents an interface circuit, which can include standalone components and integrated circuitry. In one example, multiple user interface components or peripheral components, or both, couple to interface 1214. Network interface 1250 provides compute platform

1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can exchange data with a remote device, which can include sending data stored in memory or receiving data to be stored in memory.

In one example, compute platform 1200 includes one or more I/O interface(s) 1260. I/O interface(s) 1260 can include one or more interface components through which a user interacts with compute platform 1200 (e.g., audio, alphanumeric, tactile/touch, or other interfacing). Peripheral interface 1270 can include any hardware interface not specifically mentioned above. Peripherals refer generally to devices that connect dependently to compute platform 1200. A dependent connection is one where compute platform 1200 provides the software platform or hardware platform or both on which operation executes, and with which a user interacts.

In one example, compute platform 1200 includes storage subsystem 1280 to store data in a nonvolatile manner. In one example, in certain system implementations, at least certain components of storage subsystem 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage device(s) 1284 holds code or instructions and data 1286 in a persistent state (i.e., the value is retained despite interruption of power to compute platform 1200). A portion of the code or instructions may comprise platform firmware that is executed on processor 1210. Storage device(s) 1284 can be generically considered to be a "memory," although memory 1230 is typically the executing or operating memory to provide instructions to processor 1210. Whereas storage device(s) 1284 is nonvolatile, memory 1230 can include volatile memory (i.e., the value or state of the data is indeterminate if power is interrupted to compute platform 1200). In one example, storage subsystem 1280 includes controller 1282 to interface with storage device(s) 1284. In one example controller 1282 is a physical part of interface 1214 or processor 1210 or can include circuits or logic in both processor 1210 and interface 1214. In one example, a storage device 1284 may comprise an AIC such as an NVMe SSD that is mounted to the motherboard using a CMT connector using the assemble architecture shows in the Figures herein and discussed above.

Compute platform 1200 may include an optional Baseboard Management Controller (BMC) 1290 that is configured to effect various platform management operations. BMC 1290 may include a microcontroller or other type of processing element such as a processor core, engine or micro-engine, that is used to execute instructions to effect functionality performed by the BMC. Optionally, another management component (standalone or comprising embedded logic that is part of another component) may be used.

Power source 1202 provides power to the components of compute platform 1200. More specifically, power source 1202 typically interfaces to one or multiple power supplies 1204 in compute platform 1200 to provide power to the components of compute platform 1200. In one example, power supply 1204 includes an AC to DC (alternating current to direct current) adapter to plug into a wall outlet. Such AC power can be renewable energy (e.g., solar power)

power source 1202. In one example, power source 1202 includes a DC power source, such as an external AC to DC converter. In one example, power source 1202 can include an internal battery or fuel cell source.

In the foregoing description and drawings include LP, DDR, and LPDDR memory modules. However, this is merely exemplary and non-limiting, as the teachings and principles disclosed herein may be applied to other types of memory modules and associated memory devices, including standardized memory devices (e.g., chips and/or packages). Such standards include DDR4 (Double Data Rate version 4, initial specification published in September 2012 by JEDEC (Joint Electronic Device Engineering Council). DDR4E (DDR version 4), LPDDR3 (Low Power DDR version 3, JESD209-3B, August 2013 by JEDEC), LPDDR4 (LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013), DDR5 (DDR version 5, JESD79-5A, published October, 2021), DDR version 6 (currently under draft development), LPDDR5, HBM2E, HBM3, and HBM-PIM, or others or combinations of memory technologies, and technologies based on derivatives or extensions of such specifications. The JEDEC standards are available at www.jedec.org.

As discussed above, some embodiment include one or more Other Processing Units (collectively termed XPUs). Examples of XPUs include one or more of Graphic Processor Units (GPUs) or General Purpose GPUs (GP-GPUs), Tensor Processing Units (TPUs), Data Processing Units (DPUs), Infrastructure Processing Units (IPUs), Artificial Intelligence (AI) processors or AI inference units and/or other accelerators, FPGAs and/or other programmable logic (used for compute purposes), etc. Generally, any type of XPU may be used in the CPU/SoC/XPU component in the illustrated embodiments.

The embodiments described and illustrated herein provide several advantages over existing approaches. For example, the embodiments occupy smaller overall platform board area and save VR/PMIC costs by employing a single power VR module to supply power to two LP/DDR memory modules. The embodiments also provide the ability to scale. For example, under current LP/DDR CAMMs, the existing CMT connector pad design is unable to be scaled to next generation DDR module (e.g., LP6) if different power rails are needed. A modular VR/PMIC design can scale per module requirements.

The embodiments also support sustainability. Modularity/ Removable power delivery solutions will help platforms be more conducive to debug/field servicing/replaceability for field upgradability. The solutions also allow servicing independence between DRAM and VR for component failure. The same VR module can be used in next generation DDR technology if the same power and voltage applies.

The solutions also provide power integrity, with the power VR module placed nearer to the DDR modules without passing through a CAMM module, which helps with loadline. Power savings are also provided via improved regulation efficiency with consolidated outputs, which saves power. Additionally, Dynamic Voltage/Frequency Scaling (DVFS) can be enabled for power/battery savings and synchronized between modules to avoid power rail switching latency.

The solutions also provide enhance thermal characteristics. Isolating the PMIC/VR from the same PCB/substrate as the LP/DDR DRAM chips/packages will reduce the cross heating of the DRAM chips or packages.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A power voltage regulation module, to provide power to first and second memory modules comprising:
   a substrate, having integrated first and second connector means, each comprising a plurality of connector elements;
   voltage regulation (VR) circuitry integrated on the substrate or coupled to the substrate, configured to receive one or more input voltages and provide a plurality of output voltages to power circuitry on the first and second memory modules; and
   wiring, integrated in the substrate, coupling the voltage regulation circuitry to connector elements in the first and second connector means,
   wherein one or more connector elements on at least one of the first and second connector means is configured to receive a power input voltage from at least one of the first and second memory modules, and wherein the power voltage regulation module is configured to provide the output voltages provided by the VR circuitry at multiple connection elements for each of the first and second connector means.

2. The power voltage regulation module of claim 1, wherein the connector elements in the first and second connector means comprise first and second arrays of compression mount technology (CMT) contact pads or CMT contacts.

3. The power voltage regulation module of claim 2, wherein the first array of CMT contact pads is disposed on a first side of the substrate proximate to a first edge of the substrate and the second array of CMT contact pads is disposed on the first side of the substrate proximate to a second edge of the substrate opposite of the first edge.

4. The power voltage regulation module of claim 2, wherein the first array of CMT contact pads is disposed on a topside of the substrate proximate to a first edge of the substrate and the second array of CMT contact pads is disposed on an underside of the substrate proximate to the first edge of the substrate.

5. The power voltage regulation module of claim 1, wherein the first connector means is integrated toward a first edge of the substrate and the second connector means is integrated toward a second edge of the substrate opposite of the first edge.

6. The power voltage regulation module of claim 1, wherein the connector elements in the first and second connector means comprise first and second arrays of pins.

7. The power voltage regulation module of claim 1, wherein the first and second connector means comprise first and second Ball Grid Arrays (BGAs).

8. The power voltage regulation module of claim 1, wherein the VR circuitry includes a Power Management Integrated Circuit (PMIC) having a plurality of input signals and output signals, and a portion of the contact elements for each of the first and second connector means are configured to be used for input/output (I/O) signals communicated between the first memory module and the PMIC and between the second memory module and the PMIC.

9. An assembly comprising:
   a first memory module, including a first substrate to which multiple memory devices are coupled, the first substrate having first and second integrated connector means;
   a second memory module, including a second substrate to which multiple memory devices are coupled, the second substrate having third and fourth integrated connector means; and
   a power voltage regulation module, to provide power to the first and second memory modules, including a third substrate having fifth and sixth integrated connector means and voltage regulation (VR) circuitry configured to receive one or more input voltages from at least one of the first and second memory modules and to provide multiple voltage outputs to each of the first and second memory modules,
   wherein the fifth integrated connector means is operably coupled to the first integrated connector means and the sixth connector integrated means is operably coupled to the third integrated connector means.

10. The assembly of claim 9, wherein the assembly has a side-by-side configuration, wherein the first and second memory modules are oriented side-by-side and the power voltage regulation module comprises a mezzanine power voltage regulation module that is positioned relative to the first and second memory modules such that respective portions of the third substrate overlap portions of the first and second substrates.

11. The assembly of claim 9, wherein the assembly has a stacked configuration under which at least a portion the first memory module is disposed above at least a portion of the second memory module and the power voltage regulation module is disposed between the first and second memory modules.

12. The assembly of claim 9, wherein each of the first, third, fifth, and sixth integrated connector means comprise respective arrays of Compression Mount Technology (CMT) contact pads, further comprising a first CMT connector disposed between the first substrate and the third substrate, wherein the first CMT connector includes a first array of CMT contacts or pins that are in contact with CMT contact pads for the first and fifth integrated connector means, and wherein a second CMT connector includes a second array of CMT contacts or pins that are in contact with CMT contact pads for the third and sixth integrated connector means.

13. The assembly of claim 9, wherein each of the second integrated connector means and the fourth integrated connector means comprise one or more arrays of Compression Mount Technology (CMT) contact pads disposed on the underside of the first and second substrates.

14. The assembly of claim 9, wherein one of the first and fifth integrated connector means comprises a Ball Grid Array (BGA), and the other of the first and fifth integrated connectors means comprises an array of BGA pads, and wherein the first substrate is coupled to the third substrate using an array of solder balls.

15. The assembly of claim 9, wherein the VR circuitry includes a Power Management Integrated Circuit (PMIC) having a plurality of input signals and output signals, and a portion of contact elements for each of the first and fifth integrated connector means are configured to be used for input/output (I/O) signals communicated between the first memory module and the PMIC, and wherein a portion of contact elements for each of the third and sixth integrated connector means are configured to be used for I/O signals communicated between the second memory module and the PMIC.

16. A compute platform, comprising:
a power supply, to provide one or more output voltages;
a motherboard, receiving one or more output voltage from the power supply and comprising a printed circuit board (PCB) to which a Central Processing Unit (CPU), System on a Chip (SoC), or Other Processing Unit (XPU) is operatively coupled, the PCB including first and second integrated connector means and wiring coupling input/output (I/O) signals for the CPU, SoC, or XPU to a first portion of connector elements in each of the first and second integrated connector means and wiring coupling at least one voltage to a second portion of connector elements in each of the first and second integrated connector means;
a first memory module, including a first substrate to which multiple memory devices are coupled, the first substrate having third and fourth integrated connector means;
a second memory module, including a second substrate to which multiple memory devices are coupled, the second substrate having fifth and sixth integrated connector means; and
a power voltage regulation module comprising a third substrate having seventh and eighth integrated connector means and voltage regulation (VR) circuitry configured to receive one or more input voltages from at least one of the first and second memory modules and to provide multiple voltage outputs to each of the first and second memory modules, wherein the first integrated connector means is operatively coupled to the third integrated connector means, the second integrated connector means is operatively coupled to the fifth integrated connector means, the fourth integrated connector means is operably coupled to the seventh integrated connector means and the sixth integrated connector means is operably coupled to the integrated eighth connector means.

17. The compute platform of claim 16, wherein the first and second memory modules are oriented side-by-side, and the power voltage regulation module comprises a mezzanine power voltage regulation module that is positioned relative to the first and second memory modules such that respective portions of the third substrate overlap portions of the first and second substrates.

18. The compute platform of claim 16, wherein the assembly has a stacked configuration under which at least a portion the first memory module is disposed above at least a portion of the second memory module and the power voltage regulation module is disposed between the first and second memory modules.

19. The compute platform of claim 16, wherein each of the second, fourth, seventh, and eight integrated connector means comprise respective arrays of Compression Mount Technology (CMT) contact pads, further comprising a first CMT connector disposed between the first substrate and the third substrate, wherein the first CMT connector includes a first array of CMT contacts or pins that are in contact with CMT contact pads for the second and seventh integrated connector means, and wherein a second CMT connector includes a second array of CMT contacts or pins that are in contact with CMT contact pads for the fourth and eighth integrated connector means.

20. The compute platform of claim 19, further comprising a pair of bolster plates and a two pair of fasteners with threaded ends, wherein the threaded ends are threaded into threaded inserts in the motherboard PCB or are threaded into threaded inserts in the first and second substrates.

21. The compute platform of claim 19, wherein each of the first integrated connector means and the third integrated connector means comprise one or more arrays of CMT contact pads disposed on the underside of the first and second substrates, wherein the motherboard includes array of CMT contact pads have a pattern matching the one or more arrays of CMT contact pads on the first and second substrates, and wherein one or more CMT connectors is deposed between the motherboard and the first and second substrates.

* * * * *